(12) United States Patent
Chang et al.

(10) Patent No.: US 8,880,518 B2
(45) Date of Patent: Nov. 4, 2014

(54) RANKING PRODUCTS USING PURCHASE DAY BASED TIME WINDOWS

(71) Applicant: Yahoo! Inc., Sunnyvale, CA (US)

(72) Inventors: Yi Chang, Sunnyvale, CA (US); Anlei Dong, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 194 days.

(21) Appl. No.: 13/662,159

(22) Filed: Oct. 26, 2012

(65) Prior Publication Data

US 2014/0122469 A1    May 1, 2014

(51) Int. Cl.
*G06F 7/00*     (2006.01)
*G06Q 30/00*    (2012.01)

(52) U.S. Cl.
CPC ...................................... *G06Q 30/00* (2013.01)
USPC ......................................................... 707/728

(58) Field of Classification Search
USPC ......................................................... 707/728
See application file for complete search history.

(56) References Cited

U.S. PATENT DOCUMENTS

2012/0036123 A1* 2/2012 Hasan et al. .................. 707/723

OTHER PUBLICATIONS

U.S. Appl. No. 61/546,959, filed Oct. 13, 2011, 47 pages.
U.S. Appl. No. 13/647,581, filed Oct. 9, 2012, 49 pages.
Long et al., Enhancing Product Search by Best-Selling Prediction in E-Commerce, CIKM '12 Proceedings of the 21st ACM international conference on Information and knowledge management, Oct. 29-Nov. 2, 2012, 4 pages.
Zheng et al., A Regression Framework for Learning Ranking Functions Using Relative Relevance Judgments, SIGIR '07 Proceedings of the 30th annual international ACM SIGIR conference on Research and development in information retrieval, Jul. 23-27, 2007, 8 pages.
Friedman, Greedy Function Approximation: A Gradient Boosting Machine, Feb. 24, 1999, 34 pages.

* cited by examiner

*Primary Examiner* — Etienne Leroux
*Assistant Examiner* — Ajith Jacob
(74) *Attorney, Agent, or Firm* — Pillsbury Winthrop Shaw Pittman LLP

(57) ABSTRACT

Techniques are described herein for enhancing the ranking products using purchase day based time windows. A purchase day based time window is a time window that is defined to include purchase days selected from a series of consecutive days. A purchase day is a day on which a product associated with the time window is purchased. The series of consecutive days includes the purchase days intermixed with non-purchase day(s). A non-purchase day is a day on which the product associated with the time window is not purchased. The purchase day based time window is further defined to not include the non-purchase day(s).

20 Claims, 11 Drawing Sheets

RANKING PRODUCTS USING PURCHASE DAY BASED TIME WINDOWS

BACKGROUND OF THE INVENTION

1. Field of the Invention

The present invention generally relates to techniques for ranking products in response to a search query. In particular, the present invention is related to ranking such products using purchase day based time windows.

2. Background

A search engine is a type of program that may be hosted and executed by a server. A server may execute a search engine to enable users to search for documents in a networked computer system based on search queries that are provided by the users. For instance, the server may match search terms (e.g., keywords and/or key phrases) that are included in a user's search query to metadata associated with documents that are stored in (or otherwise accessible to) the networked computer system. Documents that are retrieved in response to the search query are provided to the user as a search result. The documents are often ranked based on how closely their metadata matches the search terms. For example, the documents may be listed in the search result in an order that corresponds to the rankings of the respective documents. The document having the highest ranking is usually listed first in the search result.

With the rapid growth of electronic commerce (aka "e-commerce), online product search services have emerged as a popular and effective paradigm for customers to find and purchase desired products. Most product search engines today are based on adaptations of search engine relevance models devised for information retrieval. However, while the use of such models may lead to search results that are relevant to a customer's search query, such search results may not identify products that the customer is actually interested in purchasing.

BRIEF SUMMARY OF THE INVENTION

Various approaches are described herein for, among other things, ranking products using purchase day based time windows. A purchase day based time window is a time window that is defined to include purchase days selected from a series of consecutive days. A purchase day is a day on which a product associated with the time window is purchased. The series of consecutive days includes the purchase days intermixed with non-purchase day(s). A non-purchase day is a day on which the product associated with the time window is not purchased. The purchase day based time window is further defined to not include the non-purchase day(s).

An example method is described in which relevance values that correspond to respective products are determined in response to receipt of a search query. Each relevance value indicates a relevance of the respective product with regard to the search query. Probability values that correspond to the respective products are determined. Each probability value indicates a probability that the respective product is to be purchased by a consumer. The probability values are based on respective time windows that are associated with the respective products. Each time window is defined to include purchase days selected from a respective series of consecutive days. Each series of consecutive days includes the respective purchase days intermixed with respective non-purchase day(s). Each time window is further defined to not include the respective non-purchase day(s). Each purchase day is a day on which the product associated with the corresponding time window is purchased. Each non-purchase day is a day on which the product associated with the corresponding time window is not purchased. The relevance values and the respective probability values are combined to provide respective rankings to be assigned to the respective products with regard to the search query.

An example system is described that includes relevance logic, probability logic, and ranking logic. The relevance logic is configured to determine relevance values that correspond to respective products in response to receipt of a search query. Each relevance value indicates a relevance of the respective product with regard to the search query. The probability logic is configured to determine probability values that correspond to the respective products. Each probability value indicates a probability that the respective product is to be purchased by a consumer. The probability values are based on respective time windows that are associated with the respective products. Each time window is defined to include purchase days selected from a respective series of consecutive days. Each series of consecutive days includes the respective purchase days intermixed with respective non-purchase day(s). Each time window is further defined to not include the respective non-purchase day(s). Each purchase day is a day on which the product associated with the corresponding time window is purchased. Each non-purchase day is a day on which the product associated with the corresponding time window is not purchased. The ranking logic is configured to combine the relevance values and the respective probability values to provide respective rankings to be assigned to the respective products with regard to the search query.

An example computer program product is described that includes a first program logic module, a second program logic module, and a third program logic module. The first program logic module is configured to enable a processor-based system to determine relevance values that correspond to respective products in response to receipt of a search query. Each relevance value indicates a relevance of the respective product with regard to the search query. The second program logic module is configured to enable the processor-based system to determine probability values that correspond to the respective products. Each probability value indicates a probability that the respective product is to be purchased by a consumer. The probability values are based on respective time windows that are associated with the respective products. Each time window is defined to include purchase days selected from a respective series of consecutive days. Each series of consecutive days includes the respective purchase days intermixed with respective non-purchase day(s). Each time window is further defined to not include the respective non-purchase day(s). Each purchase day is a day on which the product associated with the corresponding time window is purchased. Each non-purchase day is a day on which the product associated with the corresponding time window is not purchased. The third program logic module is configured to enable the processor-based system to combine the relevance values and the respective probability values to provide respective rankings to be assigned to the respective products with regard to the search query.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example computer system in accordance with an embodiment described herein.

FIGS. 2-3, 8, and 10-11 depict flowcharts of example methods of ranking products using purchase day based time windows in accordance with embodiments described herein.

Figure 1:
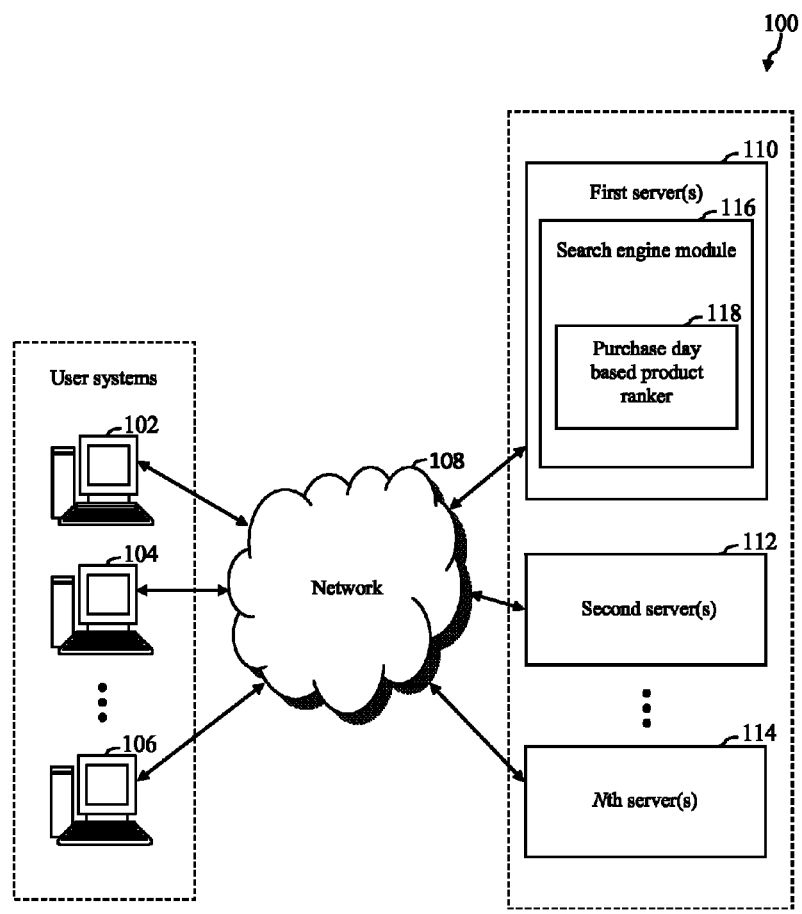

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

The detailed description describes steps corresponding to the flowcharts depicted in the accompanying drawings. It will be recognized that such steps can be performed in any order unless otherwise stated in the application.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Documents that are retrieved in response to a user's search query are referred to as a search result. In the case of a product search, each retrieved document corresponds to a product.

Example embodiments are capable of ranking products using purchase day based time windows. A purchase day based time window is a time window that is defined to include purchase days selected from a series of consecutive days. A purchase day is a day on which a product associated with the time window is purchased. The series of consecutive days includes the purchase days intermixed with non-purchase day(s). A non-purchase day is a day on which the product associated with the time window is not purchased. The purchase day based time window is further defined to not include the non-purchase day(s).

Techniques described herein for ranking products using purchase day based time windows offer a variety of benefits as compared to conventional product ranking techniques. For example, the techniques described herein take into consideration a likelihood that each product is to be purchased by a consumer. In accordance with this example, a number, frequency, etc. of future sales of each product may be estimated based on a number, frequency, etc. of past sales of the product. The purchase day based time windows described herein provide additional benefits as compared to time windows that include purchase days and non-purchase days. For instance, a product with relatively low sales volume may have a relatively high number of non-purchase days in its purchase history, and not including those non-purchase days when determining a likelihood that the product is to be purchased by a consumer may increase an accuracy of the determined likelihood. Any of a variety of factors may be taken into consideration when determining a likelihood that a product is to be purchased by a consumer. For example, a likelihood that a newer version of a popular product is to be purchased may be based on a purchase history of a previous version of the product.

II. Example Embodiments

FIG. 1 is a block diagram of an example computer system 100 in accordance with an embodiment. Generally speaking, computer system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. For example, user system 100 may provide search results in response to search queries that are provided by users. In accordance with this example, the search results may correspond to (e.g., identify) products. According to example embodiments, computer system 100 operates to rank such products using purchase day based time windows. Further detail regarding techniques for ranking products using purchase day based time windows is provided in the following discussion.

As shown in FIG. 1, computer system 100 includes a plurality of user systems 102, 104, . . . 106, a network 108, and a plurality of servers 110, 112, . . . 114. Communication among user systems 102, 104, . . . 106 and servers 110, 112, . . . 114 is carried out over network 108 using well-known network communication protocols. Network 108 may be a wide-area network (e.g., the Internet), a local area network (LAN), another type of network, or a combination thereof.

User systems 102, 104, . . . 106 are processing systems that are capable of communicating with servers 110, 112, . . . 114. Three users systems and three servers are provided for illustrative purposes and are not intended to be limiting. It will be recognized by persons skilled in the relevant art(s) that computer system 100 may include any number of user systems and any number of servers. An example of a processing system is a system that includes at least one processor that is capable of manipulating data in accordance with a set of instructions. For instance, a processing system may be a computer, a personal digital assistant, etc. User systems 102, 104, . . . 106 are configured to provide requests to servers 110, 112, . . . 114 for requesting information stored on (or otherwise accessible via) servers 110, 112, . . . 114. For instance, a user may initiate a request for information using a client (e.g., a Web browser, a Web crawler, a non-Web-enabled client, etc.) deployed on a user system 102 that is owned by or otherwise accessible to the user. In accordance with some example embodiments, user systems 102, 104, . . . 106 are capable of accessing Web sites hosted by servers 110, 112, . . . 114, so that user systems 102, 104, . . . 106 may access information that is available via the Web sites. Such Web sites include Web pages, which may be provided as hypertext markup language (HTML) documents and objects (e.g., files) that are linked therein, for example.

It will be recognized that any one or more user systems 102, 104, . . . 106 may communicate with any one or more servers 110, 112, . . . 114. Although user systems 102, 104, . . . 106 are depicted as desktop computers in FIG. 1, persons skilled in the relevant art(s) will appreciate that user systems 102, 104, . . . 106 may include any client-enabled system or device, including but not limited to a laptop computer, a tablet computer, a personal digital assistant, a cellular telephone, or the like.

Servers 110, 112, . . . 114 are processing systems that are capable of communicating with user systems 102, 104, . . . 106. Servers 110, 112, . . . 114 are configured to execute software programs that provide information to users in response to receiving requests from the users. For example, the information may include documents (e.g., Web pages, images, video files, etc.), output of executables, or any other suitable type of information. In accordance with some example embodiments, servers 110, 112, . . . 114 are configured to host respective Web sites, so that the Web sites are accessible to users of computer system 100.

One type of software program that may be executed by any one or more of servers 110, 112, . . . 114 is a search engine. A search engine is executed by a server to search for information in a networked computer system based on search queries that are provided by users. First server(s) 110 is shown to include search engine module 116 for illustrative purposes. Search engine module 116 is configured to execute a search engine. For instance, search engine module 116 may search among servers 110, 112, . . . 114 for requested information that is indicated by a search query. Such requested information may correspond to (e.g., identify) products.

Search engine module 116 includes a purchase day based product ranker 118. In general, purchase day based product ranker 118 is configured to rank products using relevance information and purchase probability information in response to receipt of a search query. The relevance information includes relevance values that correspond to the respective products. The purchase probability information includes probability values that correspond to the respective products. In particular, purchase day based product ranker 118 determines the relevance values and the probability values. Each relevance value indicates a relevance of the respective product with regard to the search query. Each probability value indicates a probability that the respective product is to be purchased by a consumer. The probability values are based on respective time windows that are associated with the respective products. Each time window is defined to include purchase days selected from a respective series of consecutive days. Each series of consecutive days includes the respective purchase days intermixed with respective non-purchase day(s). Each time window is further defined to not include the respective non-purchase day(s). Each purchase day is a day on which the product associated with the corresponding time window is purchased. Each non-purchase day is a day on which the product associated with the corresponding time window is not purchased. Purchase day based product ranker 118 combines the relevance values and the respective probability values to provide respective rankings to be assigned to the respective products with regard to the search query.

Figure 2:
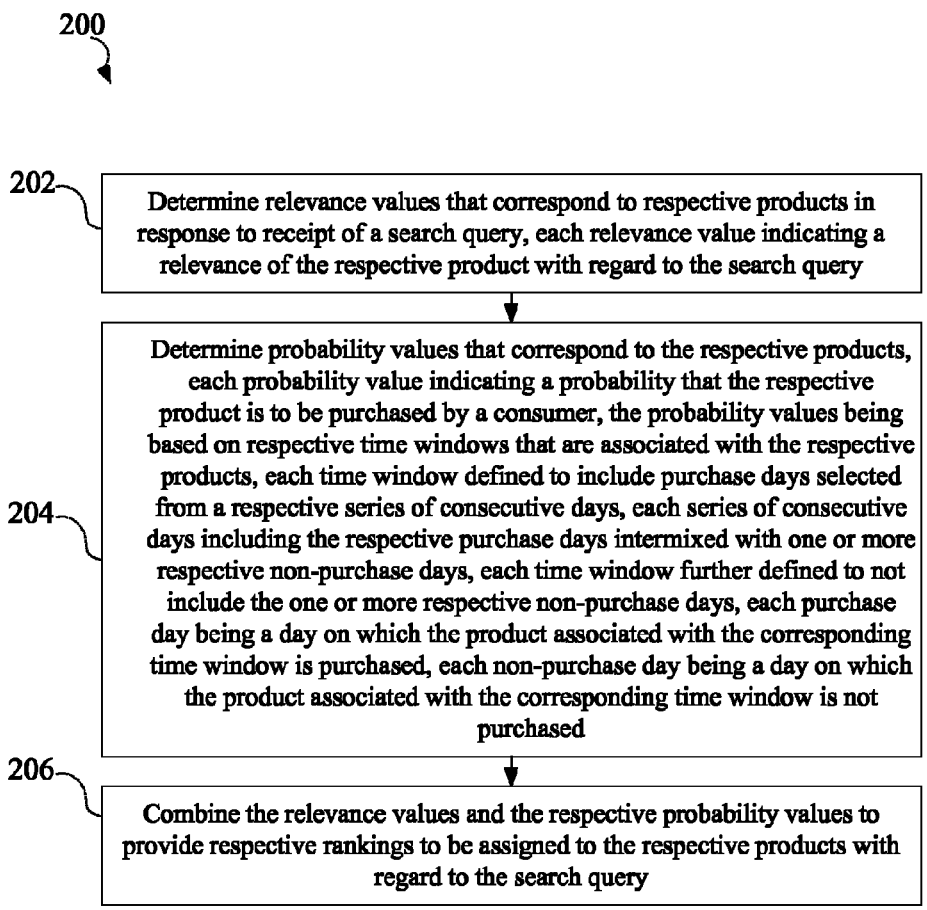
Figure 3:
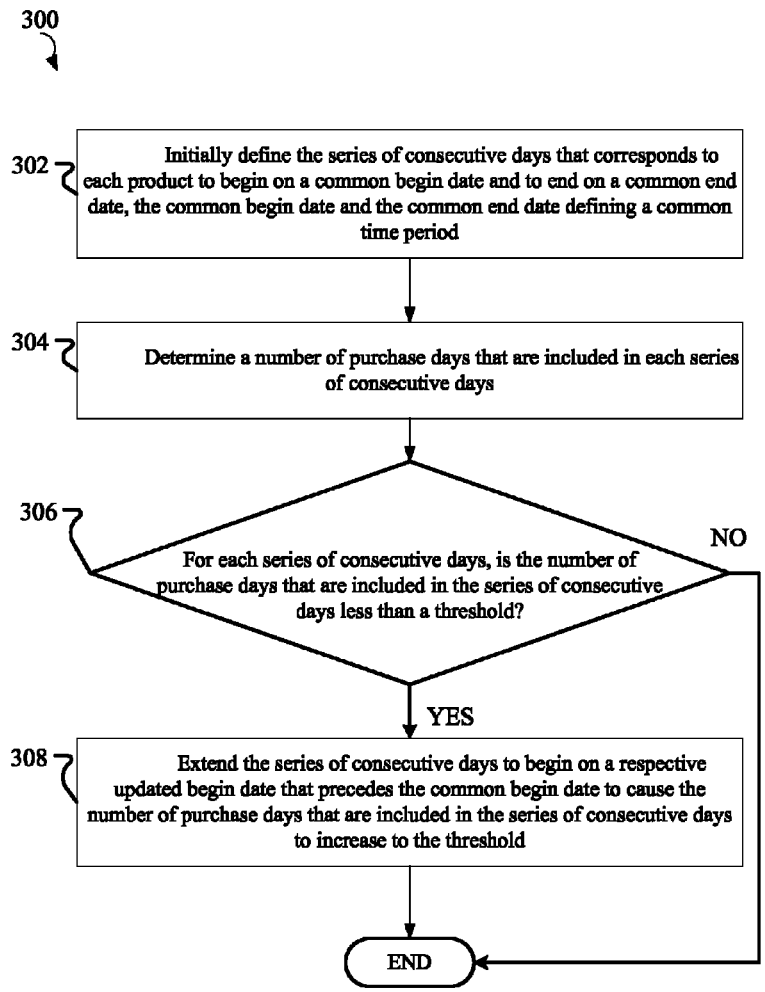
Figure 4:
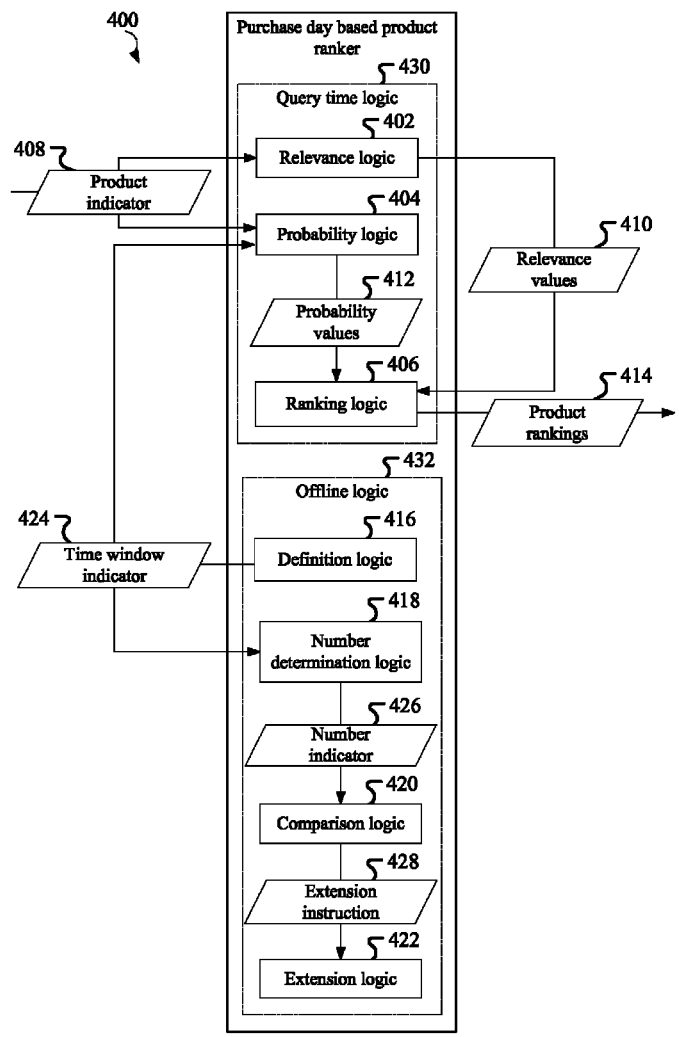
FIG. 4 depicts a block diagram of an example implementation of a purchase day based product ranker shown in FIG. 1 in accordance with an embodiment described herein.

FIGS. 2-3 depict flowcharts of example methods of ranking products using purchase day based time windows in accordance with embodiments described herein. Flowcharts 200 and 300 may be performed by purchase day based product ranker 118 of computer system 100 shown in FIG. 1, for example. For illustrative purposes, flowcharts 200 and 300 are described with respect to purchase day based product ranker 400 shown in FIG. 4, which is an example of purchase day based product ranker 118 according to an embodiment. As shown in FIG. 4, purchase day based product ranking system 400 includes query time logic 430 and offline logic 432. Query time logic 430 includes relevance logic 402, probability logic 404, and ranking logic 406. Offline logic 432 includes definition logic 416, number determination logic 418, comparison logic 420, and extension logic 422. In accordance with some example embodiments, query time logic 430 and elements thereof perform their operations at query time (i.e., in response to receipt of a search query). In accordance with some example embodiments, offline logic 432 and elements thereof perform their operations offline (i.e., before receipt of the search query occurs). For instance, offline logic 432 and elements thereof may perform their operations periodically (e.g., once per day, once per hour, etc.). Further structural and operational embodiments will be apparent to persons skilled in the relevant art(s) based on the discussion regarding flowcharts 200 and 300.

As shown in FIG. 2, the method of flowchart 200 begins at step 202. In step 202, relevance values that correspond to respective products are determined in response to receipt of a search query. Each relevance value indicates a relevance of the respective product with regard to the search query. In an example implementation, relevance logic 402 determines relevance values 410 that correspond to the respective products. For example, relevance logic 402 may determine the relevance values 410 in response to receipt of product indicator

408. In accordance with this example, the product indicator 408 may specify the products.

At step 204, the probability values that correspond to respective products are determined. Each probability value indicates a probability that the respective product is to be purchased by a consumer. The probability values are based on respective time windows that are associated with the respective products. Each time window is defined to include purchase days selected from a respective series of consecutive days. Each series of consecutive days includes the respective purchase days intermixed with one or more respective non-purchase days. Each time window is further defined to not include the one or more respective non-purchase days. Each purchase day is a day on which the product associated with the corresponding time window is purchased. Each non-purchase day is a day on which the product associated with the corresponding time window is not purchased. In an example implementation, probability logic 404 determines probability values 412 that correspond to the respective products. For example, probability logic 404 may determine the probability values 412 in response to receipt of the product indicator 408.

Figure 5:
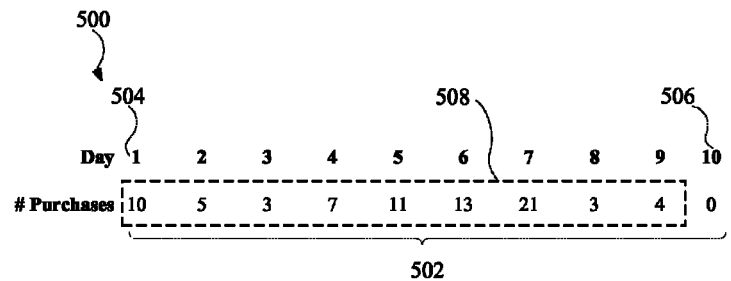
FIGS. 5-7 show example implementations of a purchase day based time window in accordance with embodiments described herein.

FIG. 5 shows an example implementation of a purchase day based time window in accordance with an embodiment described herein. In FIG. 5, product transaction history 500 is depicted as a single row of data representing the number of purchases of a product on each day in a series of consecutive days 502 (day 1 through day 10 in this example). Day 1 is referred to as a begin date 504 of the series of consecutive days 502. Day 10 is referred to as an end date 506 of the series of consecutive days 502. In one example embodiment, begin date 504 is a common begin date and end date 506 is a common end date for the series of consecutive days that correspond to the respective products. Purchase day based time window 508 is shown to include only those days in the series of consecutive days 502 on which the product is purchased. In the example of product transaction history 500, days 1-9 are purchase days because a number of purchases that is greater than zero occurs on each of days 1-9. Day 10 is a non-purchase day because no purchases of the product occur on day 10. Accordingly, purchase day based time window 508 includes purchase days 1-9 and not non-purchase day 10. A probability that the product associated with transaction history 500 is to be purchased on day 11 may be calculated based on the time window 508, which includes nine purchase days. It will be recognized that FIG. 5 shows merely one example implementation of a purchase day based time window for illustrative purposes and is not intended to be limiting. For instance, FIGS. 6 and 7, which are discussed below, show other example implementations of a purchase day based time window.

Referring back to FIG. 2, at step 206, the relevance values and the respective probability values are combined to provide respective rankings to be assigned to the respective products with regard to the search query. For example, a first product may have a relevance value and a relatively low probability value. A second product may have the same relevance value and a relatively high probability value. In accordance with this example, the first product may have a lower ranking than the second product. In another example, the first product may have a relatively high relevance value and a probability value. The second product may have a relatively low relevance value and the same probability value. In accordance with this example, the first product may have a higher ranking than the second product. These two examples are provided for illustrative purposes and are not exhaustive of the possible combinations of relevance values and probability values. For instance, persons skilled in the relevant art(s) will recognize that it is not necessary for any products to have the same relevance values or the same probability values. In an example implementation, ranking logic 406 combines the relevance values 410 and the probability values 412 to provide respective product rankings 414, which are to be assigned to the respective products with regard to the search query.

In one example embodiment, ranking logic 406 combines the relevance values 410 and the respective probability values 412 to provide the respective product rankings 414 using the following formula: $S_i = \sigma_i + \beta \cdot \eta_i$, where $S_i$ is the ranking of product i, $\sigma_i$ is the relevance value that corresponds to product i, $\eta_i$ is the probability value that corresponds to product i, and $\beta$ is a model parameter.

In an aspect of this embodiment, the model parameter $\beta$ is tuned based on cross-validation of the probability values. Cross-validation may include applying evaluation metrics, such as means square error (MSE), between an estimated number of purchases of a product and an actual number of purchases of the product that result from a consumer search.

In another example embodiment, a discounted cumulative gain (DCG) operation may be used to evaluate effectiveness of ranking logic 406 to rank the products in accordance with an interest of the user.

In yet another example embodiment, the products to which the highest product rankings are assigned are evaluated to determine whether consumers purchase those products more frequently than the others of the products.

In some example embodiments, one or more steps 202, 204, and/or 206 of flowchart 200 may not be performed. Moreover, steps in addition to or in lieu of steps 202, 204, and/or 206 may be performed. For instance, in an example embodiment, flowchart 200 includes one or more of the steps shown in flowchart 300 of FIG. 3. Flowchart 300 is described below with continued reference to the example implementations of a purchase day based time window shown in FIGS. 6 and 7 for purposes of illustration.

As shown in FIG. 3, the method of flowchart 300 begins at step 302. In step 302, the series of consecutive days that corresponds to each product is initially defined to begin on a common begin date and to end on a common end date. The common begin date and the common end date define a common time period. In an example implementation, definition logic 416 initially defines the series of consecutive days that corresponds to each product to begin on the common begin date and to end on the common end date. For example, definition logic may generate time window indicator 424, which includes an initial definition of each series of consecutive days. In accordance with this example, the initial definition may specify that each series of consecutive days is initially defined to begin on the common begin date and to end on the common end date.

Figure 6:
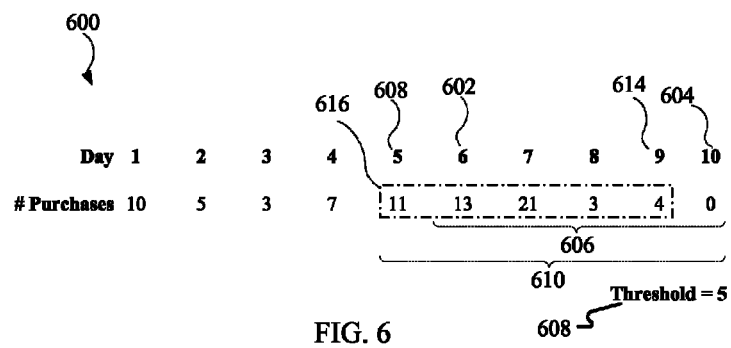

Referring to FIG. 6, a product transaction history 600 is shown to include a series of consecutive days 606, which is initially defined to begin on a common begin date 602 (day 6 in this example) and to end on a common end date 604 (day 10 in this example).

Referring back to FIG. 3, at step 304, a number of purchase days that are included in each series of consecutive days is determined. In an example implementation, number determination logic 418 determines the number of purchase days that are included in each series of consecutive days. For instance, number determination logic 418 may determine the number of purchase days that are included in each series of consecutive days based on time window indicator 424. Number determination logic 418 may generate a number indicator 426. The number indicator 426 may specify the number of purchase days that are included in each series of consecutive days.

Referring again to FIG. 6, days 6 through 9 in the series of consecutive days 606 are purchase days because the number of purchases on each of days 6 through 9 is greater than zero. Day 10 in the series of consecutive days 606 is a non-purchase day because zero purchases of the product occur on day 10. The series of consecutive days 606 therefore includes four purchase days from common begin date 602 to common end date 604.

Referring back to FIG. 3, at step 306, for each series of consecutive days a determination is made whether the number of purchase days that are included in the series of consecutive days is less than a threshold. For each series of consecutive days that includes a number of purchase days that is less than the threshold, flow continues to step 308. For each series of consecutive days that includes a number of purchase days that is not less than the threshold, flowchart 300 ends (i.e., the series of consecutive days is not extended). In an example implementation, comparison logic 420 determines whether each series of consecutive days includes a number of purchase days that is less than the threshold. For instance, comparison logic 420 may make such determination in response to receipt of the number indicator 426. Comparison logic 420 may generate extension instruction 428 to specify whether each series of consecutive days is to be extended based on a determination whether the respective series of consecutive days includes a number of purchase days that is less than the threshold.

Referring again to FIG. 6, a threshold 608 is shown to have a value of five purchase days. The series of consecutive days 606 includes four purchase days, which is less than the threshold 608. Accordingly, the determination in the example of FIG. 6 would result in a "YES". Thus, in the example of FIG. 6, meaning that step 308 is to be performed.

Referring back to FIG. 3, at step 308, the series of consecutive days is extended to begin on a respective updated begin date that precedes the common begin date to cause the number of purchase days that are included in the series of consecutive days to increase to the threshold. In an example implementation, extension logic 422 extends the respective series of consecutive days to begin on the respective updated begin date.

Referring again to FIG. 6, the series of consecutive days 606 is extended to provide an updated series of consecutive days 610. Updated series of consecutive days 610 is defined to begin on an updated begin date 608, which precedes the common begin date 602 by one day. Updated begin date 608 is a purchase day, increasing the number of purchase days in the updated series of consecutive days 610 to five, equal to the threshold 608 value of five. A resulting purchase day based time window 616 includes days 5 through 9 of the updated series of consecutive days 610.

Figure 7:
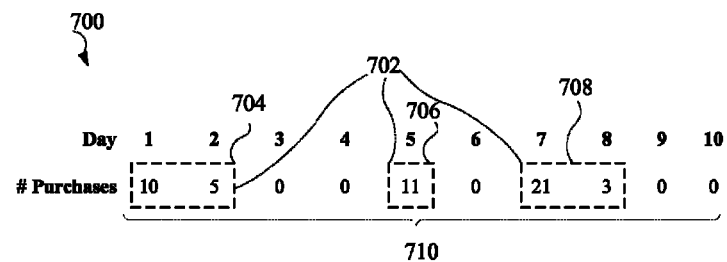

Referring now to FIG. 7, product transaction history 700 includes a series of consecutive days 710. Unlike time window 508 in FIG. 5 or time window 616, product transaction history 700 includes a non-continuous time window 702, which includes a first subset time window 704, a second subset time window 706 and a third subset time window 708. First subset time window 704 includes days 1 and 2. Second subset time window 706 includes day 5. Third subset time window 708 includes days 7 and 8. Each of the subset time windows 704, 706 and 708 is separated from a closest adjacent subset time window by one or more non-purchase days. Each non-purchase day is denoted by a zero in FIG. 7 to indicate no purchase of the product occurs on that day.

In some example embodiments, one or more steps 302, 304, 306, and/or 308 of flowchart 300 may not be performed. Moreover, steps in addition to or in lieu of steps 302, 304, 306, and/or 308 may be performed.

It will be recognized that purchase day based product ranker 400 may not include one or more of relevance logic 402, probability logic 404, ranking logic 406, definition logic 416, number determination logic 418, comparison logic 420, and/or extension logic 422. Furthermore, purchase day based product ranker 400 may include logic in addition to or in lieu of relevance logic 402, probability logic 404, ranking logic 406, definition logic 416, number determination logic 418, comparison logic 420, and/or extension logic 422.

Figure 8:
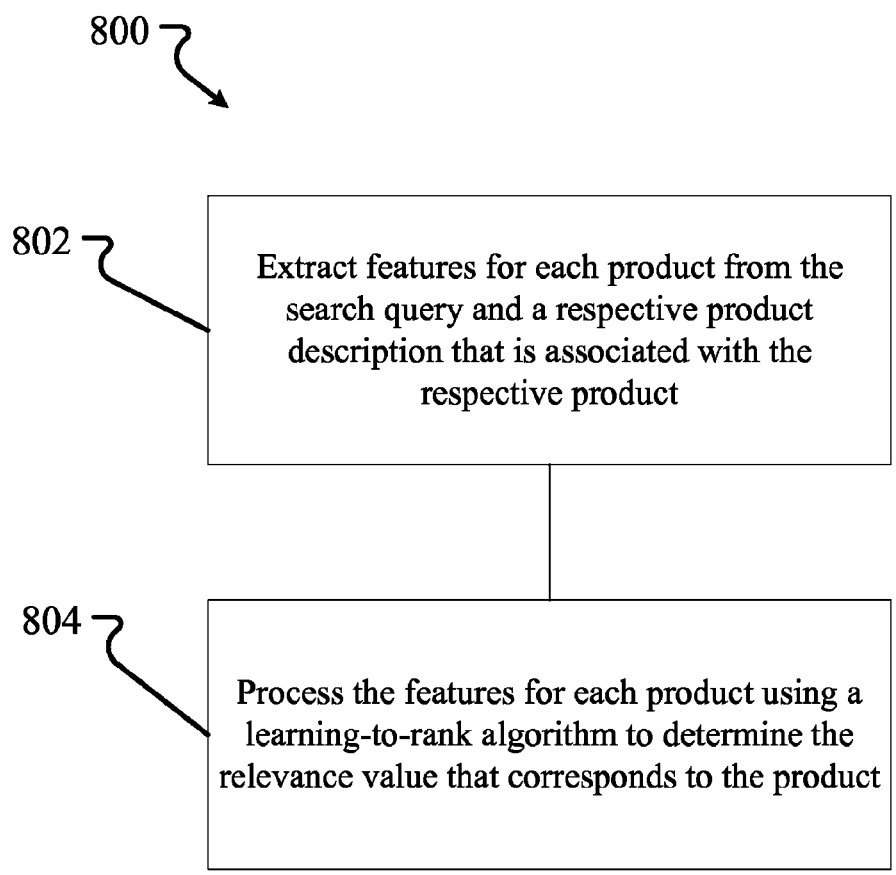
Figure 9:
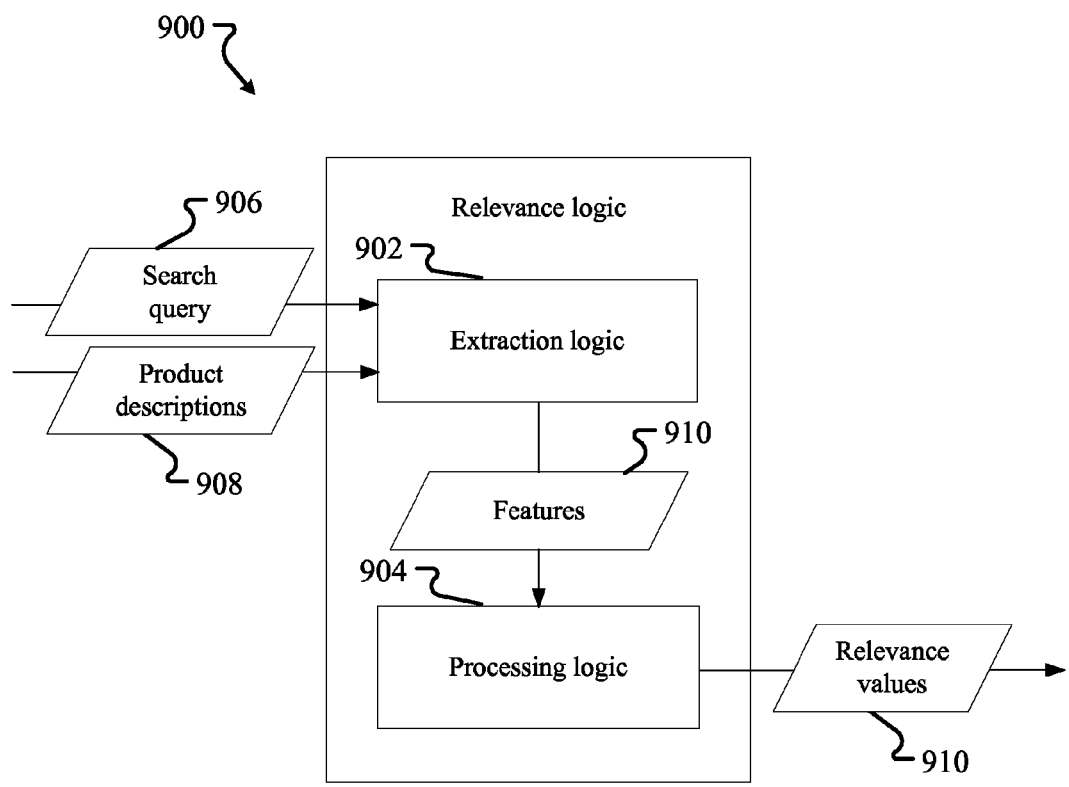
FIG. 9 depicts a block diagram of an example implementation of relevance logic shown in FIG. 4 in accordance with an embodiment described herein.

FIG. 8 depicts an example implementation of step 202 of flowchart 200 in accordance with an embodiment described herein. Flowchart 800 may be performed by relevance logic 402 of purchase day based product ranker 400 shown in FIG. 4, for example. For illustrative purposes, flowchart 800 is described with respect to relevance logic 900 shown in FIG. 9, which is an example of relevance logic 402 according to an embodiment. As shown in FIG. 9, relevance logic 900 includes extraction logic 902 and processing logic 904. Further structural and operational embodiments will be apparent to persons skilled in the relevant art(s) based on the discussion regarding flowchart 900.

As shown in FIG. 8, the method of flowchart 800 begins at step 802. In step 802 features are extracted for each product from the search query and a respective product description that is associated with the respective product. In an example implementation, extraction logic 902 extracts features 910 for each product from search query 906 and a respective product description, which is included in product descriptions 908.

In an exemplary embodiment, text feature vector $x=[x^Q, x^D, x^{QD}]$ is generated from query document pair (q, d), where $x^Q$ includes features of the search query q, $x^D$ includes features of product description (e.g., document) d, and $x^{QD}$ includes features that depend on both the search query q and the product description d. The text feature vector x is an n-dimensional vector of frequencies with which respective terms occur in metadata associated with a product description. Examples of a term include but are not limited to a word, a phrase, a phoneme, a syllable, a character (e.g., letter or number), etc. The product description metadata that corresponds to a product may include, but is not limited to, a title of the product, a description of the product, user reviews regarding the product, a technical description of the product, and/or any other text metadata typically found in an online product catalog.

In creating a feature vector, stop words such as "the" and "a" may be excluded (e.g., removed). Specific terms may be found to be more important than common words, such as "4G" or "Nike." In some embodiments, a feature vector generator may look for words in common among the search query and the product description. For example, a user may submit a search query for "shampoo," and "Pantene shampoo" may be one of the products indicated by a search result that is generated by the search engine. The feature generator may return the word "shampoo" for query feature $x^Q$, "Pantene shampoo" for product description feature $x^D$, and "shampoo" for query and description feature $x^{QD}$.

At step 804, the features for each product are processed using a learning-to-rank algorithm to determine the relevance value that corresponds to the product. A learning-to-rank algorithm uses machine learning to build a ranking model. Learning-to-rank techniques follow a two-step process. First, a ranking model is trained with training data. The training data includes product descriptions and search queries. Second, the ranking model is used to rank the relevance of products to a search query. As will be appreciated by those skilled in the relevant art(s), any suitable learning-to-rank technique may be used. Example types of a learning-to-rank technique include but not limited to, a semantic technique, a text matching technique, a classic learn-to-rank technique, a supported vector machine technique, and a gradient boosted decision tree technique. In an example implementation, processing logic 904 processes the features 910 to determine relevance values 910 that correspond to the products.

In one example embodiment, a gradient boosted decision tree (GBDT) technique is used to train a ranking model, which is used to calculate the relevance value for each product. GBDT is an additive regression technique that includes a plurality of trees fitted to current residuals and gradients of the loss function in a forward step-wise manner. GBDT iteratively fits an additive model as shown by the following equation:

$$f_t(x) = T_t(x;\theta) + \lambda \Sigma_{i=1}^{t-1} \beta_i T_i(x_i;\theta_i),$$

where x is a ranking feature vector of a search query and a product description, $\theta$ is a decision tree parameter, $\beta$ is a decision tree weight, and $\lambda$ is a learning rate. At iteration t, tree $T(x; \theta)$ is included to fit the negative gradient by least square, or:

$$\hat{\theta} = \underset{\beta}{\operatorname{argmin}} \sum_i^N (-G_{it} - \beta_t T_t(x_i); \theta)^2.$$

$G_{it}$ is the gradient over the current prediction function:

$$G_{it} = \left[ \frac{\partial L(y_i, f(x_i))}{\partial f(x_i)} \right]_{f=f_{t-1}}.$$

The optimal weights of tree $\beta_t$ are determined by:

$$\beta_t = \operatorname{argmin}_\beta \Sigma_i^N L(y_i, f_{t-1}(x_i) + \beta T(x, \theta)).$$

In some example embodiments, one or more steps 802 and/or 804 of flowchart 800 may not be performed. Moreover, steps in addition to or in lieu of steps 802 and/or 804 may be performed.

It will be recognized that relevance logic 900 may not include one or more of extraction logic 902 and/or processing logic 904. Furthermore, relevance logic 900 may include logic in addition to or in lieu of extraction logic 902 and/or processing logic 904.

Figure 10:
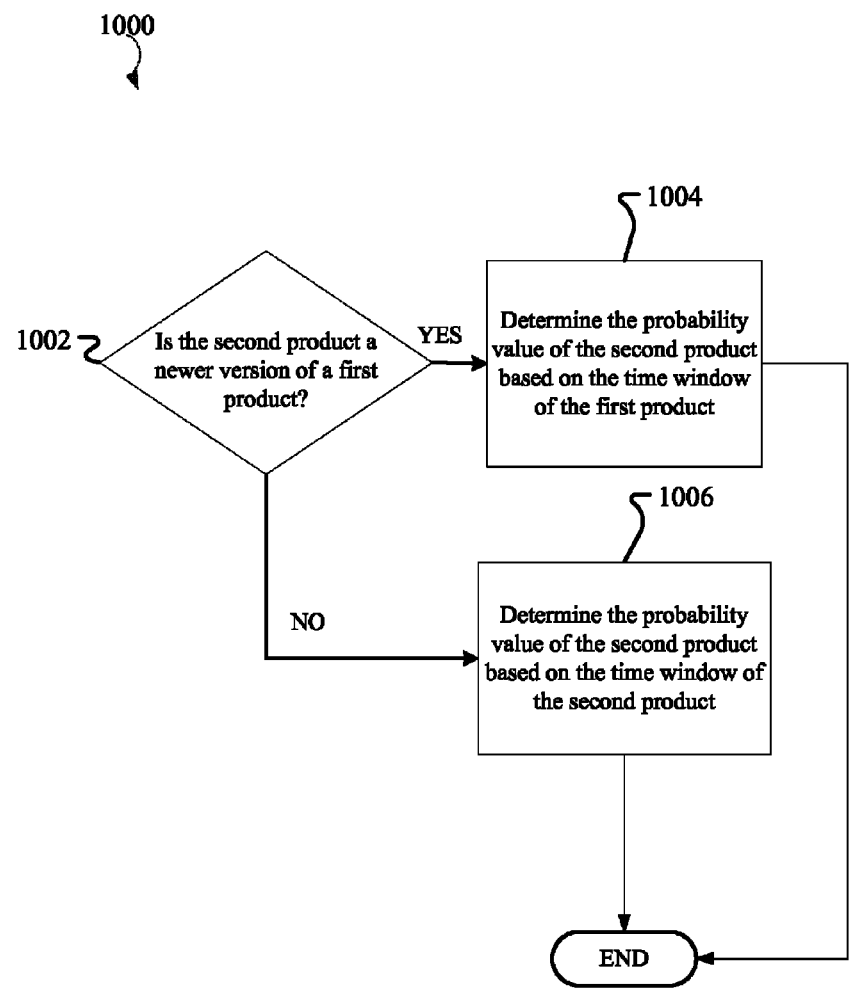
Figure 11:
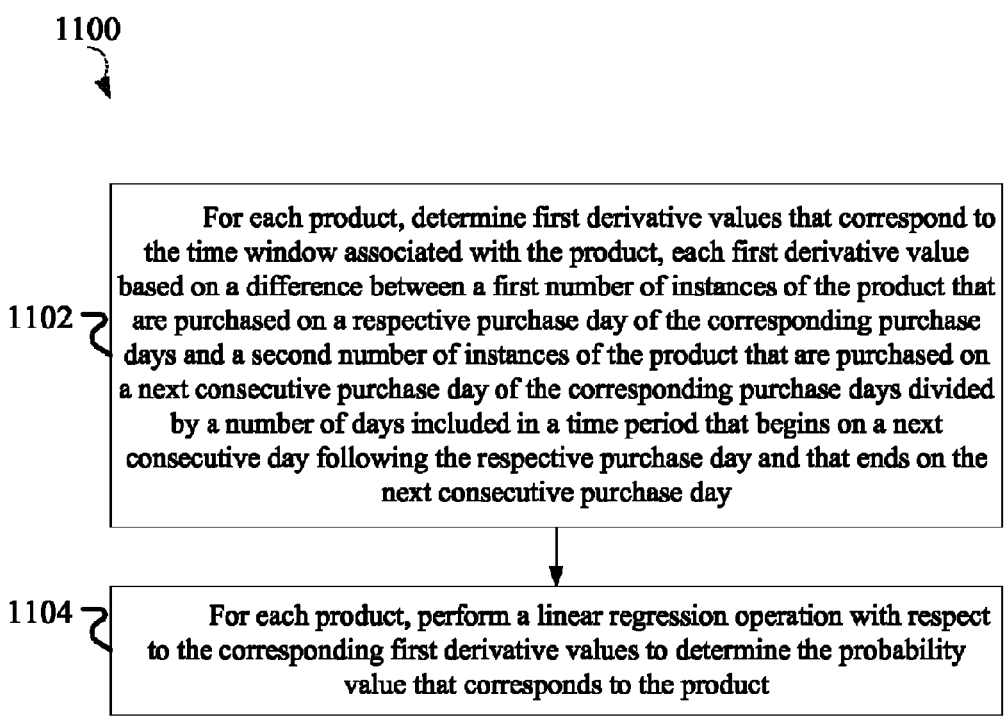
Figure 12:
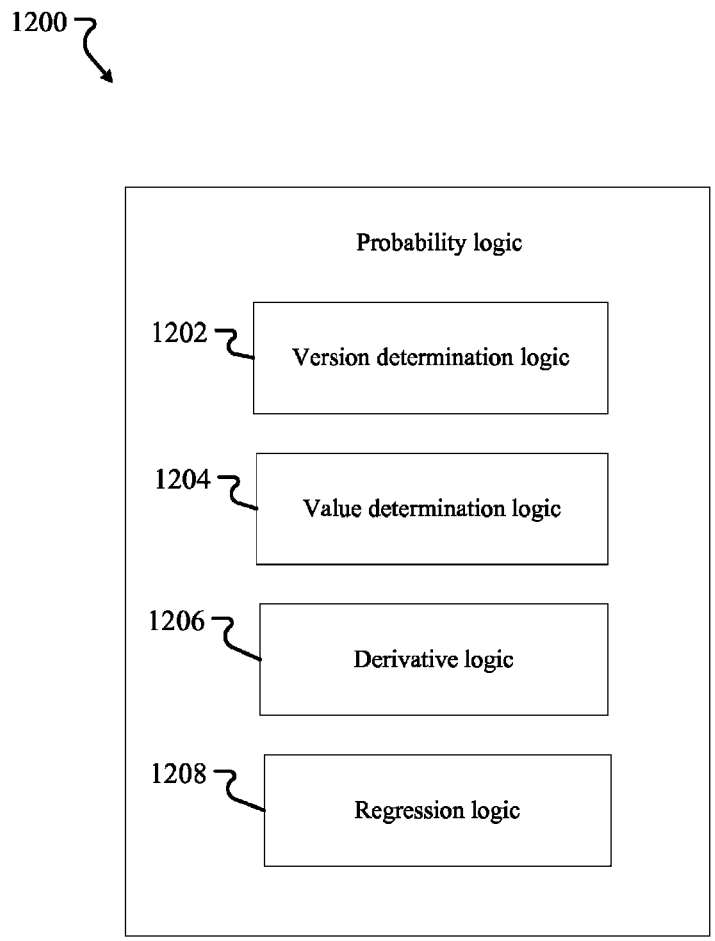
FIG. 12 depicts a block diagram of an example implementation of probability logic shown in FIG. 4 in accordance with an embodiment described herein.

FIGS. 10 and 11 depict example implementations of step 204 of flowchart 200 in accordance with embodiments described herein. Flowcharts 1000 and 1100 may be performed by probability logic 404 of purchase day based product ranker 400 shown in FIG. 4, for example. For illustrative purposes, flowcharts 1000 and 1100 are described with respect to probability logic 1200 shown in FIG. 12, which is an example of probability logic 404 according to an embodiment. As shown in FIG. 12, probability logic 1200 includes version determination logic 1202, value determination logic 1204, derivative logic 1206, and regression logic 1208. Further structural and operational embodiments will be apparent to persons skilled in the relevant art(s) based on the discussion regarding flowcharts 1000 and 1100.

As shown in FIG. 10, the method of flowchart 1000 begins at step 1002. In step 1002, a determination is made whether a second product is a newer version of a first product. For example, an iPhone 5 may be a newer product with no purchase history, but a previous version of the product, such as iPhone 4, may have an established purchase history. If the second product is a newer version of the first product, flow continues to step 1004. If the second product is not a newer version of the first product, flow continues to step 1006. In an example implementation, version determination logic 1202 determines whether the second product is a newer version of the first product.

At step 1004, the probability value of the second product is determined based on the time window of the first product. For example, the probability value of an iPhone 5 may be determined based on the time window of the iPhone 4. In an example implementation, value determination logic 1204 determines the probability value of the second product based on the time window of the first product.

In step 1006, the probability value of the second product is determined based on the time window of the second product. In an example implementation, value determination logic 1204 determines the probability value of the second product based on the time window of the second product.

In some example embodiments, one or more steps 1002, 1004, and/or 1006 of flowchart 1000 may not be performed. Moreover, steps in addition to or in lieu of steps 1002, 1004, and/or 1006 may be performed.

As shown in FIG. 11, the method of flowchart 1100 begins at step 1102. In step 1102, for each product, first derivative values are determined that correspond to the time window associated with the product. Each first derivative value is based on a difference between a first number of instances of the product that are purchased on a respective purchase day of the corresponding purchase days and a second number of instances of the product that are purchased on a next consecutive purchase day of the corresponding purchase days divided by a number of days included in a time period that begins on a next consecutive day following the respective purchase day and that ends on the next consecutive purchase day. In an example implementation, derivative logic 1206 determines the first derivative values for each product.

In an exemplary embodiment, the difference between the first number and the second number may be further divided by a sum of the first number and the second number. In accordance with this embodiment, A first derivative value $x_i$ pertaining to an i-th purchase day may be represented using the following equation:

$$x_i = \frac{2.0(s_i - s_{i-1})}{(s_i + s_{i-1})(d_i - d_{i-1})},$$

where $s_i$ denotes a number of instances of the product that are purchased on the i-th purchase day; and $d_i$ corresponds to a date of the i-th purchase day.

In step 1104, for each product, a linear regression operation is performed with respect to the corresponding first derivative values to determine the probability value that corresponds to the product. In an example implementation, regression logic 1208 performs the linear regression operation with respect to the corresponding first derivative values for each product to determine the probability value that corresponds to the respective product.

In an example embodiment, the number of instances of the product that are predicted to be purchased, $s_{k+1}$, for day $d_{k+1}$ may be represented using the following equation:

$$s_{k+1} = \left(1 + \sum_{i=1}^{k} \frac{\alpha_i x_i}{d_{k+1} - d_k}\right) s_k,$$

where $x_i$ is the first derivative value pertaining to the i-th purchase day; $\alpha_i$ is a model parameter that may be learned from training data; and $s_k$ is the number of instances of the product that are purchased on purchase day, $d_k$.

In some example embodiments, one or more steps 1102 and/or 1104 of flowchart 1100 may not be performed. Moreover, steps in addition to or in lieu of steps 1102 and/or 1104 may be performed.

It will be recognized that probability logic 1200 may not include one or more of version determination logic 1202, value determination logic 1204, derivative logic 1206, and/or regression logic 1208. Furthermore, probability logic 1200 may include logic in addition to or in lieu of version determination logic 1202, value determination logic 1204, derivative logic 1206, and/or regression logic 1208.

III. Other Example Embodiments

Search engine module 116, purchase day based product ranker 118, relevance logic 402, probability logic 404, ranking logic 406, definition logic 416, number determination logic 418, comparison logic 420, extension logic 422, extraction logic 902, processing logic 904, version determination logic 1202, value determination logic 1204, derivative logic 1206, and/or regression logic 1208 may be implemented in hardware, or any combination of hardware with software and/or firmware. For example, search engine module 116, purchase day based product ranker 118, relevance logic 402, probability logic 404, ranking logic 406, definition logic 416, number determination logic 418, comparison logic 420, extension logic 422, extraction logic 902, processing logic 904, version determination logic 1202, value determination logic 1204, derivative logic 1206, and/or regression logic 1208 may be implemented as computer program code configured to be executed in one or more processors. In another example, search engine module 116, purchase day based product ranker 118, relevance logic 402, probability logic 404, ranking logic 406, definition logic 416, number determination logic 418, comparison logic 420, extension logic 422, extraction logic 902, processing logic 904, version determination logic 1202, value determination logic 1204, derivative logic 1206, and/or regression logic 1208 may be implemented as hardware logic/electrical circuitry.

IV. Example Computer Implementation

Figure 13:
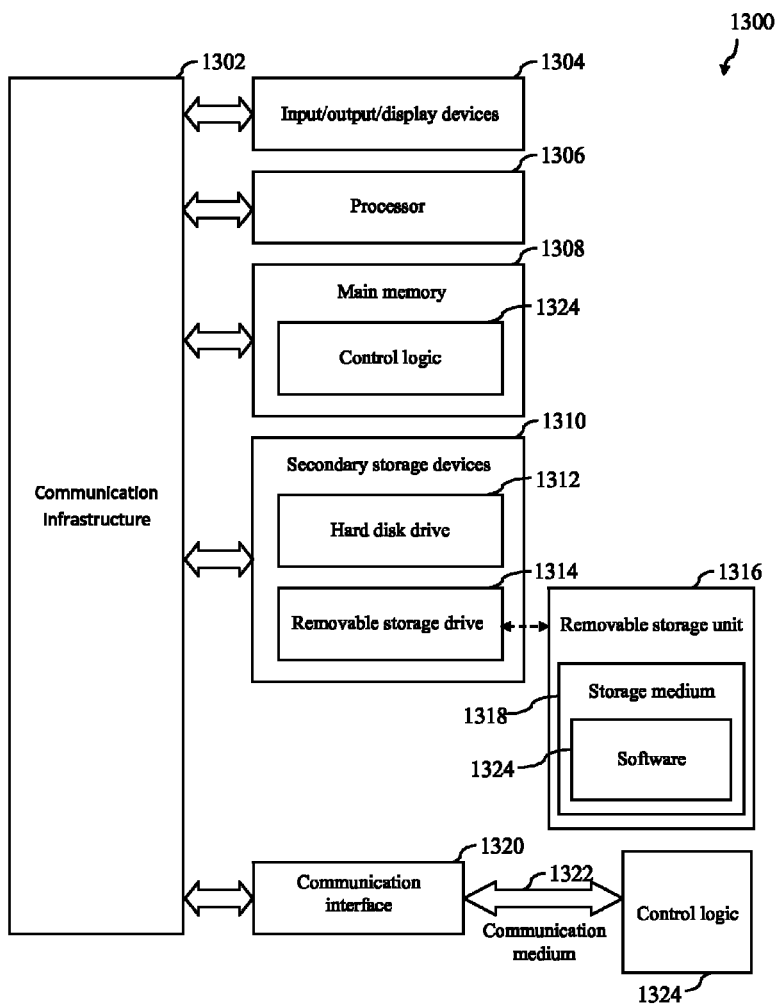
FIG. 13 is a block diagram of a computer in which embodiments may be implemented.

The embodiments described herein, including systems, methods/processes, and/or apparatuses, may be implemented using well known servers/computers, such as computer 1300 shown in FIG. 13. For example, elements of example computer system 1300, including any of the user systems 102, 104, ... 106 and any of the servers 110, 112, ... 114 depicted in FIG. 1 and elements thereof, and each of the steps of flowchart 200 depicted in FIG. 2, each of the steps of flowchart 300 depicted in FIG. 3, each of the steps of flowchart 800 depicted in FIG. 8, each of the steps of flowchart 1000 depicted in FIG. 10, and/or each of the steps of flowchart 1100 depicted in FIG. 11 can each be implemented using one or more computers 1300.

Computer 1300 can be any commercially available and well known computer capable of performing the functions described herein, such as computers available from International Business Machines, Apple, Sun, HP, Dell, Cray, etc.

Computer 1300 may be any type of computer, including a desktop computer, a server, etc.

As shown in FIG. 13, computer 1300 includes one or more processors (e.g., central processing units (CPUs)), such as processor 1306. Processor 1306 may include search engine 116 and/or purchase day based product ranker 118 of FIG. 1; relevance logic 402, probability logic 404, ranking logic 406, definition logic 416, number determination logic 418, comparison logic 420, and/or extension logic 422 of FIG. 4; extraction logic 902 and/or processing logic 904 of FIG. 9; version determination logic 1202, value determination logic 1204, derivative logic 1206, and/or regression logic 1208 of FIG. 12; or any portion or combination thereof, for example, though the scope of the embodiments is not limited in this respect. Processor 1306 is connected to a communication infrastructure 1302, such as a communication bus. In some embodiments, processor 1306 can simultaneously operate multiple computing threads.

Computer 1300 also includes a primary or main memory 1308, such as a random access memory (RAM). Main memory has stored therein control logic 1324 (computer software), and data.

Computer 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, computer 1300 may include an industry standard interface, such as a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1326 (control logic) and/or data. Removable storage unit 1316 represents a floppy disk, magnetic tape, compact disc (CD), digital versatile disc (DVD), Blue-ray disc, optical storage disk, memory stick, memory card, or any other computer data storage device. Removable storage drive 1314 reads from and/or writes to removable storage unit 1316 in a well-known manner.

Computer 1300 also includes input/output/display devices 1304, such as monitors, keyboards, pointing devices, microphones, motion capture devices, etc.

Computer 1300 further includes a communication or network interface 1320. Communication interface 1320 enables computer 1300 to communicate with remote devices. For example, communication interface 1320 allows computer 1300 to communicate over communication networks or mediums 1322 (representing a form of a computer useable or readable medium), such as local area networks (LANs), wide area networks (WANs), the Internet, etc. Network interface 1320 may interface with remote sites or networks via wired or wireless connections. Examples of communication interface 1322 include but are not limited to a modem, a network interface card (e.g., an Ethernet card), a communication port, a Personal Computer Memory Card International Association (PCMCIA) card, etc.

Control logic 1328 may be transmitted to and from computer 1300 via the communication medium 1322.

Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, cause such data processing devices to operate as described herein, represent embodiments of the invention.

For example, each of the elements of search engine module 116 and/or purchase day based product ranker 118, each depicted in FIG. 1; relevance logic 402, probability logic 404, ranking logic 406, definition logic 416, number determination logic 418, comparison logic 420, and/or extension logic 422, each depicted in FIG. 4; extraction logic 902 and/or processing logic 904, each depicted in FIG. 9; version determination logic 1202, value determination logic 1204, derivative logic 1206, and/or regression logic 1208, each depicted in FIG. 12; each of the steps of flowchart 200 depicted in FIG. 2; each of the steps of flowchart 300 depicted in FIG. 3; each of the steps of flowchart 800 depicted in FIG. 8; each of the steps of flowchart 1000 depicted in FIG. 10; and/or each of the steps of flowchart 1100 depicted in FIG. 11 can be implemented as control logic that may be stored on a computer useable medium or computer readable medium, which can be executed by one or more processors to operate as described herein.

Computer readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The proper interpretation of subject matter described and claimed herein is limited to patentable subject matter under 35 U.S.C. §101. As described and claimed herein, a method is a process defined by 35 U.S.C. §101. As described and claimed herein, each of a device, apparatus, machine, system, computer, module, and computer readable medium is a machine or manufacture defined by 35 U.S.C. §101.

What is claimed is:

1. A method comprising:
   determining a plurality of relevance values that corresponds to a plurality of respective products in response to receipt of a search query, each relevance value indicating a relevance of the respective product with regard to the search query;
   determining a plurality of probability values that corresponds to the plurality of respective products, each probability value indicating a probability that the respective product is to be purchased by a consumer, the plurality of probability values being based on a plurality of respective time windows that are associated with the plurality of respective products, each time window defined to include a respective plurality of purchase days selected from a respective series of consecutive days, each series of consecutive days including the respective plurality of purchase days intermixed with one or more respective non-purchase days, each time window further defined to not include the one or more respective non-purchase days, each purchase day being a day on which the product associated with the corresponding time window is purchased, each non-purchase day being a day on which the product associated with the corresponding time window is not purchased; and
   combining the plurality of relevance values and the plurality of respective probability values to provide a plurality of respective rankings to be assigned to the plurality of respective products with regard to the search query.

2. The method of claim 1, further comprising:
   selecting the plurality of products from a corpus of products based on the plurality of relevance values that correspond to the plurality of respective products reaching a relevance threshold;
   wherein combining the plurality of relevance values and the plurality of probability values comprises:
      combining the plurality of relevance values and the plurality of probability values in response to selecting the plurality of products from the corpus.

3. The method of claim 1, wherein a first time window of the plurality of time windows includes a first subset of the corresponding plurality of purchase days and a second subset of the corresponding plurality of purchase days; and
   wherein at least one of the one or more respective non-purchase days is included between the first subset and the second subset.

4. The method of claim 1, further comprising:
   defining each time window of the plurality of time windows to include a same number of purchase days.

5. The method of claim 1, wherein the series of consecutive days that corresponds to each product begins on a common begin date and ends on a common end date to define a common time period.

6. The method of claim 1, further comprising:
   initially defining the series of consecutive days that corresponds to each product to begin on a common begin date and to end on a common end date, the common begin date and the common end date defining a common time period;
   determining a number of purchase days that are included in each series of consecutive days; and
   for each series of consecutive days, if the number of purchase days that are included in the series of consecutive days is less than a threshold, extending the series of consecutive days to begin on a respective updated begin date that precedes the common begin date to cause the number of purchase days that are included in the series of consecutive days to increase to the threshold.

7. The method of claim 1, wherein determining the plurality of probability values comprises:
   determining that a second product of the plurality of products is a newer version of a first product of the plurality of products, the first product being associated with a first time window of the plurality of time windows that corresponds to the plurality of purchase days on which the first product is purchased; and
   determining the probability value that corresponds to the second product based on the first time window in response to determining that the second product is a newer version of the first product.

8. The method of claim 1, wherein determining the plurality of probability values comprises:
for each product of the plurality of products, determining a plurality of first derivative values that correspond to the time window associated with the product, each first derivative value of the plurality of first derivative values based on a difference between a first number of instances of the product that are purchased on a respective purchase day of the corresponding plurality of purchase days and a second number of instances of the product that are purchased on a next consecutive purchase day of the corresponding plurality of purchase days divided by a number of days included in a time period that begins on a next consecutive day following the respective purchase day and that ends on the next consecutive purchase day, and
for each product of the plurality of products, performing a linear regression operation with respect to the corresponding plurality of first derivative values to determine the probability value that corresponds to the product.

9. A system comprising:
relevance logic configured to determine a plurality of relevance values that corresponds to a plurality of respective products in response to receipt of a search query, each relevance value indicating a relevance of the respective product with regard to the search query;
probability logic configured to determine a plurality of probability values that corresponds to the plurality of respective products, each probability value indicating a probability that the respective product is to be purchased by a consumer, the plurality of probability values being based on a plurality of respective time windows that are associated with the plurality of respective products, each time window defined to include a respective plurality of purchase days selected from a respective series of consecutive days, each series of consecutive days including the respective plurality of purchase days intermixed with one or more respective non-purchase days, each time window further defined to not include the one or more respective non-purchase days, each purchase day being a day on which the product associated with the corresponding time window is purchased, each non-purchase day being a day on which the product associated with the corresponding time window is not purchased; and
ranking logic configured to combine the plurality of relevance values and the plurality of respective probability values to provide a plurality of respective rankings to be assigned to the plurality of respective products with regard to the search query.

10. The system of claim 9, wherein the plurality of products is associated with a plurality of respective product descriptions;
wherein the relevance logic comprises:
extraction logic configured to extract a plurality of features for each product of the plurality of products from the search query and the respective product description; and
processing logic configured to process the plurality of features for each product using a learning-to-rank algorithm to determine the relevance value that corresponds to the product.

11. The system of claim 9, wherein the relevance logic is configured to determine the plurality of relevance values based on a machine learning model that is trained with a gradient boosted decision tree model.

12. The system of claim 9, wherein a first time window of the plurality of first time windows includes a first subset of the corresponding plurality of purchase days and a second subset of the corresponding plurality of purchase days; and
wherein at least one of the one or more respective non-purchase days is included between the first subset and the second subset.

13. The system of claim 9, wherein each time window of the plurality of time windows includes a same number of purchase days.

14. The system of claim 9, wherein the probability logic comprises:
version determination logic configured to determine that a second product of the plurality of products is a newer version of a first product of the plurality of products, the first product being associated a first time window of the plurality of time windows that corresponds to the plurality of purchase days on which the first product is purchased; and
value determination logic configured to determine the probability value that corresponds to the second product based on the first time window in response to a determination that the second product is a newer version of the first product.

15. The system of claim 9, wherein the probability logic comprises:
derivative logic configured to determine, for each product of the plurality of products, a plurality of first derivative values that correspond to the time window associated with the product, each first derivative value of the plurality of first derivative values based on a difference between a first number of instances of the product that are purchased on a respective purchase day of the corresponding plurality of purchase days and a second number of instances of the product that are purchased on a next consecutive purchase day of the corresponding plurality of purchase days divided by a number of days included in a time period that begins on a next consecutive day following the respective purchase day and that ends on the next consecutive purchase day; and
regression logic configured to perform, for each product of the plurality of products, a linear regression operation with respect to the corresponding plurality of first derivative values to determine the probability value that corresponds to the product.

16. A computer program product comprising a computer-readable medium having computer program logic recorded thereon for enabling a processor-based system to rank a plurality of products using a plurality of respective time windows, the computer program logic comprising:
a first program logic module for enabling the processor-based system to determine a plurality of relevance values that corresponds to the plurality of respective products in response to receipt of a search query, each relevance value indicating a relevance of the respective product with regard to the search query;
a second program logic module for enabling the processor-based system to determine a plurality of probability values that corresponds to the plurality of respective products, each probability value indicating a probability that the respective product is to be purchased by a consumer, the plurality of probability values being based on a plurality of respective time windows that are associated with the plurality of respective products, each time window defined to include a respective plurality of purchase days selected from a respective series of consecutive days, each series of consecutive days including the respective plurality of purchase days intermixed with one or more respective non-purchase days, each time window further defined to not include the one or more respective non-purchase days, each purchase day being a day on which the product associated with the corresponding time window is purchased, each non-purchase day being a day on which the product associated with the corresponding time window is not purchased; and a third program logic module for enabling the processor-based system to combine the plurality of relevance values and the plurality of respective probability values to provide a plurality of respective rankings to be assigned to the plurality of respective products with regard to the search query.

17. The computer program product of claim 16, wherein the plurality of products is associated with a plurality of product descriptions;

wherein the first program logic module includes logic for enabling the processor-based system to extract a plurality of features for each product of the plurality of products from the search query and the respective product description; and wherein the first program logic module further includes logic for enabling the processor-based system to process the plurality of features for each product using a learning-to-rank algorithm to determine the relevance value that corresponds to the product.

18. The computer program product of claim 16, wherein the first program logic module includes logic for enabling the processor-based system to determine the plurality of relevance values based on a machine learning model that is trained with a gradient boosted decision tree model.

19. The computer program product of claim 16, wherein the second program logic module includes logic for enabling the processor-based system to determine a first time window of the plurality of time windows for a corresponding product of the plurality of products that includes a first subset of the corresponding plurality of purchase days and a second subset of the corresponding plurality of purchase days; and wherein at least one of the one or more respective non-purchase days is included between the first subset and the second subset.

20. The computer program product of claim 16, wherein each time window of the plurality of time windows includes a same number of purchase days.

* * * * *